(12) United States Patent
Hezeque et al.

(10) Patent No.: US 8,470,196 B2
(45) Date of Patent: Jun. 25, 2013

(54) ACTIVE MATERIAL COMPOSITION FOR THE NEGATIVE ELECTRODE OF A LITHIUM-ION ACCUMULATOR

(75) Inventors: Thierry Hezeque, Aubie Espessas (FR); Fermin Cuevas, Lardy (FR); Michel Latroche, Saint-Cyr-l'Ecole (FR); Georges Caillon, Bruges (FR); Christian Jordy, St Louis de Montferrand (FR); Claudette Audry, Bruges (FR)

(73) Assignees: Saft Groupe SA, Bagnolet (FR); Centre National de la Recherche Scientifique, Paris (FR); Universite Paris XII Val de Marne, Creteil Cedex (FR)

( * ) Notice: Subject to any disclaimer, the term of this patent is extended or adjusted under 35 U.S.C. 154(b) by 517 days.

(21) Appl. No.: 12/757,730

(22) Filed: Apr. 9, 2010

(65) Prior Publication Data

US 2010/0270497 A1    Oct. 28, 2010

Related U.S. Application Data

(60) Provisional application No. 61/186,225, filed on Jun. 11, 2009.

(30) Foreign Application Priority Data

Apr. 10, 2009    (EP) ..................... 09290266

(51) Int. Cl.
  *H01M 4/88* (2006.01)
  *H01M 4/13* (2010.01)
  *H01M 4/58* (2010.01)

(52) U.S. Cl.
  USPC ..... 252/182.1; 252/500; 252/516; 252/521.3; 429/218.1; 429/231.8; 429/232

(58) Field of Classification Search
  USPC ............ 252/182.1, 516, 521.3, 500; 429/206, 429/218.1, 231.5, 231.8, 232
  See application file for complete search history.

(56) References Cited

U.S. PATENT DOCUMENTS

2006/0115734 A1 *  6/2006  Ishihara et al. ............ 429/231.8
2007/0148544 A1    6/2007  Le

* cited by examiner

*Primary Examiner* — Bijan Ahvazi
(74) *Attorney, Agent, or Firm* — Sughrue Mion, PLLC

(57) ABSTRACT

An alloy comprising tin, silicon and carbon, and containing a crystalline M-Sn phase, M being an inert metal.
An alloy comprising tin and silicon, comprising:
  a) a nanocrystalline phase containing at least 50 at. % of the element silicon $Si°$;
  b) a nanocrystalline phase containing a compound based on tin;
  c) a nanocrystalline phase constituted by the element tin $Sn°$.
A manufacturing process for this alloy.

21 Claims, 10 Drawing Sheets

Intensity (I.U.)

ACTIVE MATERIAL COMPOSITION FOR THE NEGATIVE ELECTRODE OF A LITHIUM-ION ACCUMULATOR

CROSS REFERENCE TO RELATED APPLICATIONS

This application claims the benefit of U.S. Provisional Patent Application No. 61/186,225, filed Jun. 11, 2009, and European Patent Application No. 09290266.7, filed Apr. 10, 2009, in the U.S. Patent and Trademark Office and European Patent Office respectively, the disclosure of all of which are incorporated herein by reference.

TECHNICAL FIELD

The invention relates to the technical field of metal alloys based on silicon and tin used as negative electrode (anode) materials for a lithium-ion accumulator. The invention also relates to the technical field of manufacturing processes for metal alloys based on silicon and tin.

STATE OF THE ART

Graphite is known as a negative electrode material for a lithium-ion accumulator. This material has an electrochemical capacity of 370 mAh/g in theory and of approximately 340 mAh/g in practice, which can be greatly improved by using new materials.

Materials based on tin and silicon have a theoretical electrochemical storage capacity respectively 2.5 and 10 times higher than graphite. However, they have a very short lifetime because of the large volume variation which occurs during the lithiation/delithiation cycles of the material.

Composite materials based on graphite and silicon have an improved lifetime compared with pure silicon (>100 cycles) but these generally contain only 10% silicon; above 10% silicon, the loss of capacity during cycling becomes very significant. Because of this, the capacity of the negative electrode with an acceptable lifetime is in the order of 750 mAh/g and a volume capacity of 1240 mAh/cm$^3$ (capacity expressed in the charged state).

The solutions that can be identified in the literature essentially propose resolving the problem of the loss of electrical contact associated with the swelling of the material during cycling. With this aim, the prior art relates to the production of composite materials silicon/carbon (graphite, carbon black, nanotubes), silicon/metal, thin layer, use of a binder with a strong adhesive power (carboxymethyl cellulose (CMC), polyacrylic acid or derivatives, polyimide). The document FR-A-2 885 734 describes a manufacturing process for a silicon-carbon composite material.

Moreover, silicon and tin are two elements which form alloys with lithium and which have complementary properties: the not very conductive silicon coalesces little while the very conductive tin tends to coalesce during electrochemical operation. The combination of these two elements in an alloy based on lithium is therefore attractive.

Nevertheless, the synthesis of an alloy containing silicon and tin is complicated because of the malleable character of tin which then tends to create large agglomerates. The material obtained in this way is implemented as an electrode active material with difficulty because of its large granulometry (>35 μm) and the electrochemical results are unconvincing.

The document US2007/0148544 describes a manufacturing process for an alloy based on silicon and tin. In Examples 15 and 16 this document describes the stage of preparing a mixture of a silicon powder, a tin powder and a cobalt or nickel powder, followed by the synthesis of the alloy by mechanosynthesis. On the one hand, the alloy is obtained in a single mechanosynthesis stage. On the other hand, the mechanosynthesis stage is carried out in the absence of carbon powder. The alloy obtained in these two examples comprises an amorphous phase comprising silicon and an amorphous phase comprising tin.

The document JP2005-158305 describes a manufacturing process for an alloy based on silicon and tin. In Example 38 this document describes the stage of mixing silicon, tin, silver and iron in the form of powders. The alloy is obtained by mechanosynthesis. The operation of the mechanosynthesis is interrupted halfway through to allow a powder of a carbonaceous material to be incorporated. The compound obtained has an electrochemical capacity of 910 mAh/g. This falls to 567 mAh/g after five cycles. The cycle lifetime of this example is therefore unsatisfactory. Moreover, as explained above, the synthesis of an alloy starting from a mixture of powders containing both silicon and tin is complicated because of the malleable character of tin which then tends to create large agglomerates.

A negative electrode material for a lithium-ion accumulator which has an electrochemical capacity by mass of more than 1000 mAh/g, a volume capacity in the charged state of at least 1800 mAh/cm$^3$, as well as a long cycle lifetime, is therefore sought. A long cycle lifetime corresponds to a number of cycles of more than 180 cycles, preferably more than 200 cycles for a capacity loss of less than 20% with respect to the initial capacity.

A process making it possible to manufacture an alloy based on tin and silicon which may be easily used as a negative electrode material, in other words with a granulometry fine enough to be implemented as the active material of a negative electrode in a lithium accumulator, is also sought. A process making it possible to reduce the decomposition of a prealloy based on tin is also sought.

SUMMARY OF THE INVENTION

The subject of the invention is an alloy comprising tin, silicon and carbon, and containing a crystalline M-Sn phase, M being an inert metal. An inert metal is defined as a metal that does not form lithiated compounds having a significant quantity of lithium, i.e. greater than 0.05 Li/M, at the potential for forming SiLix compounds (potential greater than 50 mV with respect to the Li$^+$/Li$^\circ$ electrochemical couple).

Another subject of the invention is an alloy comprising tin and silicon, comprising:

a) a nanocrystalline phase containing at least 50 at. % of the element silicon Si$^\circ$;

b) a nanocrystalline phase containing a compound based on tin;

c) a nanocrystalline phase constituted by the element tin Sn$^\circ$.

According to an embodiment, the nanocrystalline phase a) and/or particles containing silicon are covered at least partially by the nanocrystalline phase b) and/or the nanocrystalline phase c).

According to an embodiment, the nanocrystalline phase a) and/or at least one particle containing silicon are covered at least partially by a nanocrystalline phase rich in tin, a phase rich in tin being present if, on at least one concentration profile measured with a transmission electron microscope, the alloy has a concentration peak such that the ratio Sn$_{max}$/Max(Sn$_1$, Sn$_2$) is greater than 1.1, preferably greater than 1.3;

where $Sn_{max}$ indicates the concentration by mass at the maximum of the concentration peak of tin;

$Sn_1$ and $Sn_2$ indicate the concentrations by mass of tin at the two bases of the peak; and $Max(Sn_1, Sn_2)$ represents the maximum value for $Sn_1$ and $Sn_2$;

the concentration profile having, as an origin, a point distant from the centre of the particles containing silicon by a distance comprised between 20 and 100 nm; the centre of the particles containing silicon being defined as the point corresponding to the centre of the zones of the highest concentration of silicon measured by transmission electron microscopy (TEM) imaging.

According to an embodiment, the quantity of tin Sn° in the nanocrystalline phase c) represents up to 50%, preferably from 5 to 50%, preferably from 10 to 40%, of the total quantity of tin present in the alloy.

According to an embodiment, the quantity of tin Sn° in the nanocrystalline phase c) represents less than 5%, preferably less than 3%, of the total quantity of tin present in the alloy.

According to an embodiment, the formula of the alloy is $Si_aSn_bC_cM_m$ where

M represents at least one inert metal, Al or a mixture thereof;

$0.20 \leq a \leq 0.80$;
$0.05 \leq b \leq 0.40$;
$0.05 \leq c \leq 0.50$;
$0.01 \leq m \leq 0.30$;
$a+b>0.45$;
$a+b+c+m=1$.

According to an embodiment, the percentage by mass of the quantity of phase containing at least 95% silicon in phase a) is greater than 30%, preferably greater than 40%, of the total percentage by mass of silicon contained in the alloy.

According to an embodiment, the alloy does not comprise any SiC phase.

According to an embodiment, the alloy does not comprise any crystalline carbon.

According to an embodiment, the alloy comprises the element Al present in an atomic fraction of less than 0.05, preferably from 0.02 to 0.03, with respect to the alloy.

According to an embodiment, the size of the particles containing silicon is from 20 to 200 nm, preferably from 20 to 100 nm, preferably from 20 to 50 nm.

Another subject of the invention is an electrode comprising an alloy according to the invention.

Another subject of the invention is a lithium-ion accumulator comprising at least one negative electrode which is an electrode according to the invention.

Finally, a subject of the invention is a manufacturing process for an alloy comprising silicon and tin, comprising the stages of:

a) preparing a prealloy from tin and at least one inert metal, or aluminium or a mixture thereof;

b) adding carbon, silicon and optionally inert metal to the prealloy of stage a);

c) synthesizing the alloy.

This process solves the problem of the total decomposition of the prealloy into tin Sn° and makes it possible to obtain a powder of an alloy based on tin and silicon having a granulometry fine enough to be implemented as active material for a negative electrode in a lithium-ion accumulator.

According to an embodiment, the specific surface area of the carbon is comprised between 20 and 500 m²/g, preferably between 20 and 100 m²/g.

DETAILED DESCRIPTION OF EMBODIMENTS OF THE INVENTION

Figure 1:
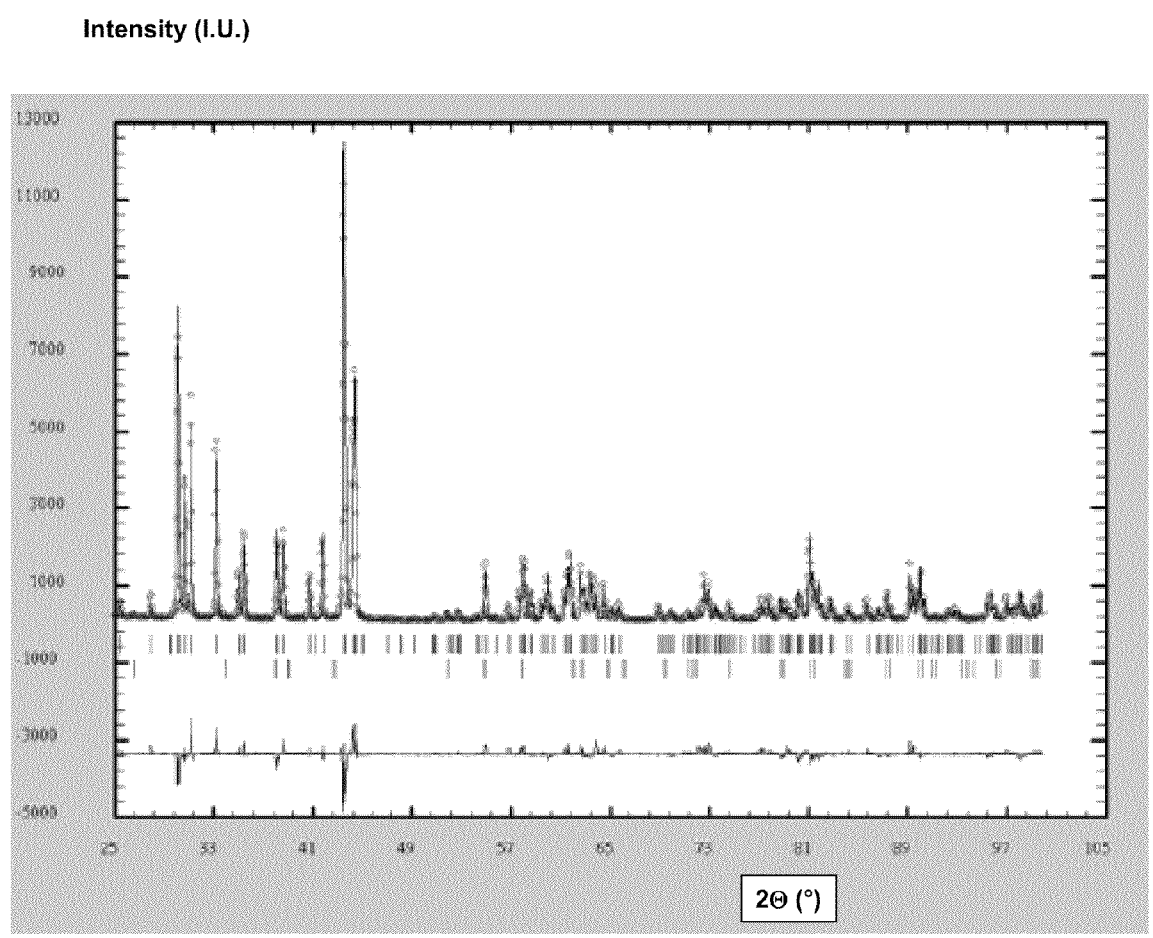
FIG. 1: Analysis, using the Rietveld method, of the compound $Ni_{3.4}Sn_4$. The diffraction pattern is refined with a majority phase (99.5% by mass) of $Ni_{3.4}Sn_4$.

The manufacturing process according to the invention makes it possible to manufacture an alloy based on silicon and on tin while solving the problem of the tendency of tin to create large agglomerates which cannot then be used in the manufacture of a negative electrode active material for a lithium accumulator. An alloy can be defined as a metallic product obtained by mixing one or more elements into a metal. The elements of an alloy react with each other to form a system constituted by several phases.

In order to solve this problem, a prealloy comprising tin and at least one inert metal or Al or a mixture thereof is prepared in a first stage. An inert metal is defined as a metal that does not form lithiated compounds having a significant quantity of lithium, i.e. greater than 0.05 Li/M, at the potential for forming SiLix compounds (potential greater than 50 mV with respect to the $Li^+/Li°$ electrochemical couple).

Preferably, the inert metal is chosen from the group comprising Ni, Fe, Cu, Co, Mn, Ti, Zr, Y, Zn, Mo, Nb, V, W, Ag, Au, In, Mg, Pd, Pt, the rare earths, the lanthanides, or a mixture thereof.

Tin is mixed with the inert metal(s) or Al or a mixture thereof. Preferably, the tin and the inert metals and/or Al are in the form of powder. The prealloy can be obtained by heating or by mechanosynthesis, for example by grinding the mixture of powders in a ball mill (ball milling). In a preferred embodiment, the inert metal is nickel. The manufacture of the prealloy makes it possible to limit the agglomeration of the tin.

Preferably, the formula of the prealloy is $Ni_{3+x}Sn_4$ with x comprised between 0.2 and 0.6; preferably between 0.3 and 0.5. It is possible for example to manufacture a prealloy with the formula $Ni_{3.4}Sn_4$ by metallurgy of the nickel (Cerac 99.9%, granulometry <45 μm) and tin (Alfa-Aesar 99.8%, granulometry <45 μm) powders. The nickel and tin powders are pressed into the form of pellets which are then placed in a sealed silica ampoule under argon and annealed at approximately 700° C. for approximately one week. Other prealloys can be envisaged, such as $Cu_6Sn_5$ and $Fe_{50}Sn_{50}$.

In a second stage, the final alloy is manufactured, for example by mechanosynthesis, by adding the remaining chemical elements constituting the alloy, including the silicon, with carbon in a comminuted state. The silicon used can have granulometric size of less than or equal to approximately 1 μm.

In a particular embodiment, the carbon used has a BET specific surface area comprised between 20 and 500 $m^2/g$, preferably between 20 and 50 $m^2/g$. Below 20 $m^2/g$, there are not enough carbon/metallic powder interfaces to avoid agglomeration of the particles. Above 500 $m^2/g$, the irreversible capacity of the alloy is too great. The carbon can for example be in the form of carbon black. Ordinary graphite such as that used in the negative electrodes of a conventional lithium-ion accumulator and carbon fibres are not sufficient for the process according to the invention because their specific surface area is too small or their form factor is unsuitable. In the absence of carbon in a comminuted state, the alloy obtained is in the form of balls several millimeters in diameter which are extremely difficult to reduce to the form of a fine powder. The X-ray diffraction (XRD) analysis and the estimation of the quantity of each phase by refining using the Rietveld method show that, in the absence of carbon in a comminuted state, the prealloy based on tin is completely decomposed, forming nanocrystalline tin. The transmission electron microscopy (TEM) analyses confirm the presence of quasi-pure tin. The pure tin coalesces and adheres to the walls of the container used for the mechanosynthesis. The addition of comminuted carbon acts as a lubricant and anticaking agent during the stage of preparing the final alloy. The effect of this is to reduce the decomposition of the prealloy into pure tin. It therefore makes it possible to limit the formation of pure tin originating from the decomposition of the prealloy of tin, which leads to a significant agglomeration of the particles. In the presence of comminuted carbon, the M-Sn phase used as precursor decomposes slightly. It is possible to observe, by X-rays and scanning transmission electron microscopy, a very fine layer of tin Sn° around the silicon nanocrystallites. The Applicant sees this type of nanostructure as beneficial for the performances during cycling as tin allows the interface between silicon, the surface area of which will increase by 150% when charging, and the other potentially inert phases, the surface area of which should vary little or not at all, to be accommodated. This type of nanostructure proves to be more mechanically stable during the swelling/contraction cycles of the active material.

At the end of this second stage of synthesizing the alloy, the final alloy is obtained, containing the following phases:
- a nanocrystalline phase constituted by the prealloy,
- a nanocrystalline phase constituted by the silicon element containing at least 50 at. %. The presence of particles of a compound containing silicon and nickel is also observed by TEM.

In a particular embodiment, the quantity of silicon in the nanocrystalline phase constituted by the element silicon is more than 50 at. % of the total quantity of silicon contained in the alloy.

In an embodiment, the phases containing tin are nanocrystalline, i.e. the size of the crystallites is less than 100 nm, preferably less than 50 nm.

In an embodiment, the alloy does not comprise an SiC phase measurable by X-ray diffraction (XRD).

In an embodiment, the alloy does not comprise carbon in crystalline form.

The process according to the invention can advantageously be used to manufacture an alloy with the formula $Si_aSn_bC_cM_m$ where M represents at least one inert metal or Al or a mixture thereof; and in which:

$0.20 \leq a \leq 0.80$; preferably $0.20 \leq a \leq 0.50$, preferably also $0.30 \leq a \leq 0.50$. Silicon is the main element causing the high capacities by mass; too little silicon leads to a low capacity and too much silicon leads to a short lifetime by losing electrical contacts associated with swelling and with the semiconductor nature of silicon.

$0.05 \leq b \leq 0.40$; preferably $0.10 \leq b \leq 0.30$, preferably also $0.15 \leq b \leq 0.25$. Tin contributes to the capacity. It also has the advantage of being very conductive and ductile, which helps to maintain the electrical contacts during swelling and contraction. Nevertheless, pure tin tends to coalesce, which also presents problems in terms of lifetime.

$0.05 \leq c \leq 0.50$; preferably $0.10 \leq c \leq 0.40$, preferably also $0.10 \leq c \leq 0.25$. Carbon acts as a lubricant and anticaking agent, and minimizes the reaction between the silicon and the M-Sn phase. It makes it possible to obtain fine powders that can be easily implemented and, on the other hand, it helps to form a phase rich in tin around particles containing silicon. The presence of the phase rich in tin allows the variations in volume of the silicon during the charge and discharge cycles of the accumulator to be accommodated more easily. The quantity of pure tin Sn° is sufficiently reduced by the process according to the invention so that coalescence phenomena do not occur.

$0.01 \leq m \leq 0.30$; preferably $0.05 \leq m \leq 0.25$, preferably also $0.10 \leq m \leq 0.25$. The inert metal serves, on the one hand, to limit the overall volumetric expansion of the alloy and, on the other hand, to ensure a good electronic conduction inside the particles of the alloys. Nevertheless, too large a quantity has a detrimental effect on the capacity.

The addition of aluminium into the alloy makes it possible to improve the properties during cycling. It also contributes to the capacity (up to 1Li/atom compared with 4.4Li for Si and Sn and 0.17Li for graphite. Preferably, the atomic fraction of aluminium is less than 0.05, preferably from 0.02 to 0.03, with respect to the alloy. Above 0.05, the capacity and lifetime of the alloy are reduced.

$a+b>0.45$. This condition makes it possible to have enough Si and Sn to ensure a high capacity.

The alloy according to the invention has a high electrochemical capacity, of at least 800 mAh/g, as well as a long cycle lifetime. A long lifetime corresponds to a number of cycles of more than 180 cycles, preferably more than 200 cycles for a capacity loss of less than 20% with respect to the initial capacity.

It can therefore be used advantageously as electrochemically active material in a negative electrode of a lithium accumulator.

EXAMPLES

The compound $Si_{0.32}Sn_{0.18}C_{0.32}Ni_{0.14}Al_{0.04}$ (Example 1) was processed by mechanosynthesis from aluminium powder, silicon powder and a prealloy with the formula $Ni_{3.4}Sn_4$. 32 at. % of carbon, for example in the form of carbon black, was added as lubricant during the grinding. The aluminium used (Aldrich, purity: 99%) has a particle size of less than 75 µm and the silicon has a particle size of less than 1 µm.

The mixture of Si, Al, $Ni_{3.4}Sn_4$ and carbon powders was placed in a jar mill containing steel balls (diameter=7 mm) in order to carry out the mechanical grinding under an inert atmosphere (argon). The total mass of the starting powder without carbon is 6 g. The ratio of the masses of balls/powder is equal to 5. The grinding is carried out in a planetary mill (Fritsch P7) at a disc rotation speed of 600 rpm. Powder samplings were carried out at different stages of the grinding (grinding time equal to 1 h, 5 h, 10 h and 20 h) to carry out X-ray diffraction (XRD) analyses. At each sampling, all of the powder is mechanically detached from the walls of the jar in order to obtain a representative sample of the whole of the powder. At the end of the grinding (20 h), the samples were analysed by XRD and by transmission electron microscopy (TEM).

In order to obtain TEM samples that are thin enough, the grinding product is mixed with copper powder, rolled in a steel foil and thinned by ionic abrasion. The TEM observations were made on a Tecnai G2 F20 electron microscope operating at an acceleration voltage of 200 kV both in transmission electron microscopy (TEM) mode for the images and in scanning transmission electron microscopy (STEM) mode coupled with the (EDX) chemical analysis to acquire the maps and the profile lines for the elements. Transmission electron microscopy provides a resolution of the order of cubic nanometers.

Figure 2:
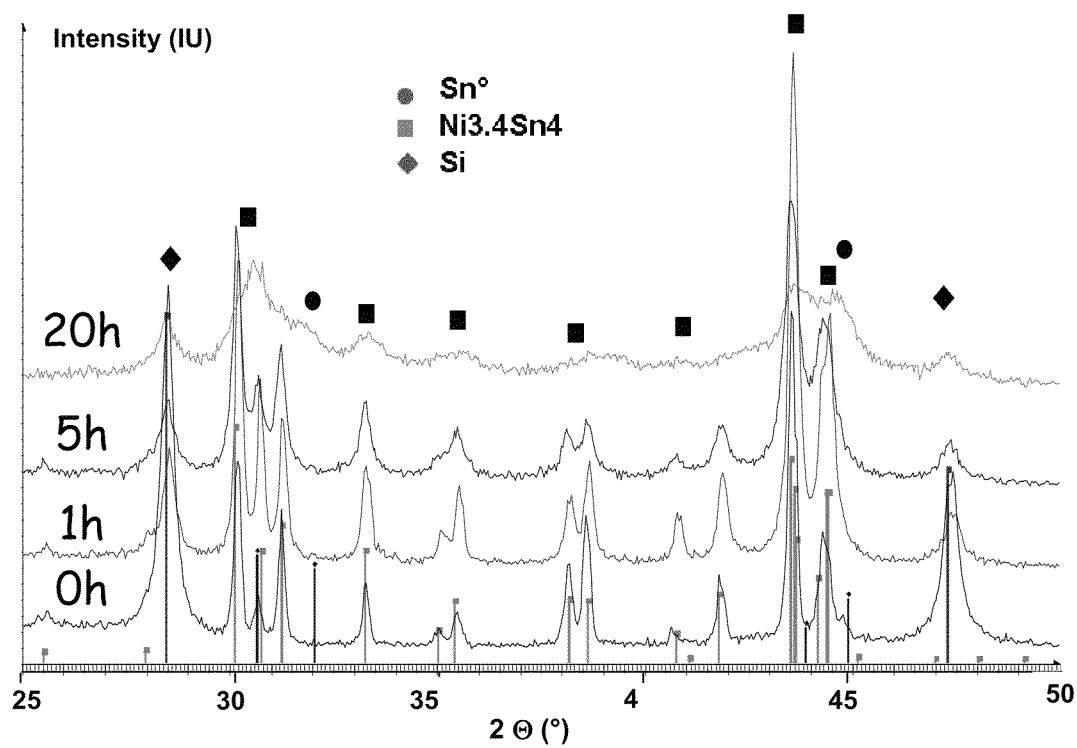
FIG. 2: Evolution of the X-ray diffraction (XRD) patterns as a function of the grinding time. The $Ni_{3.4}Sn_4$, Sn° and Si° phases are identified.
Figure 3:
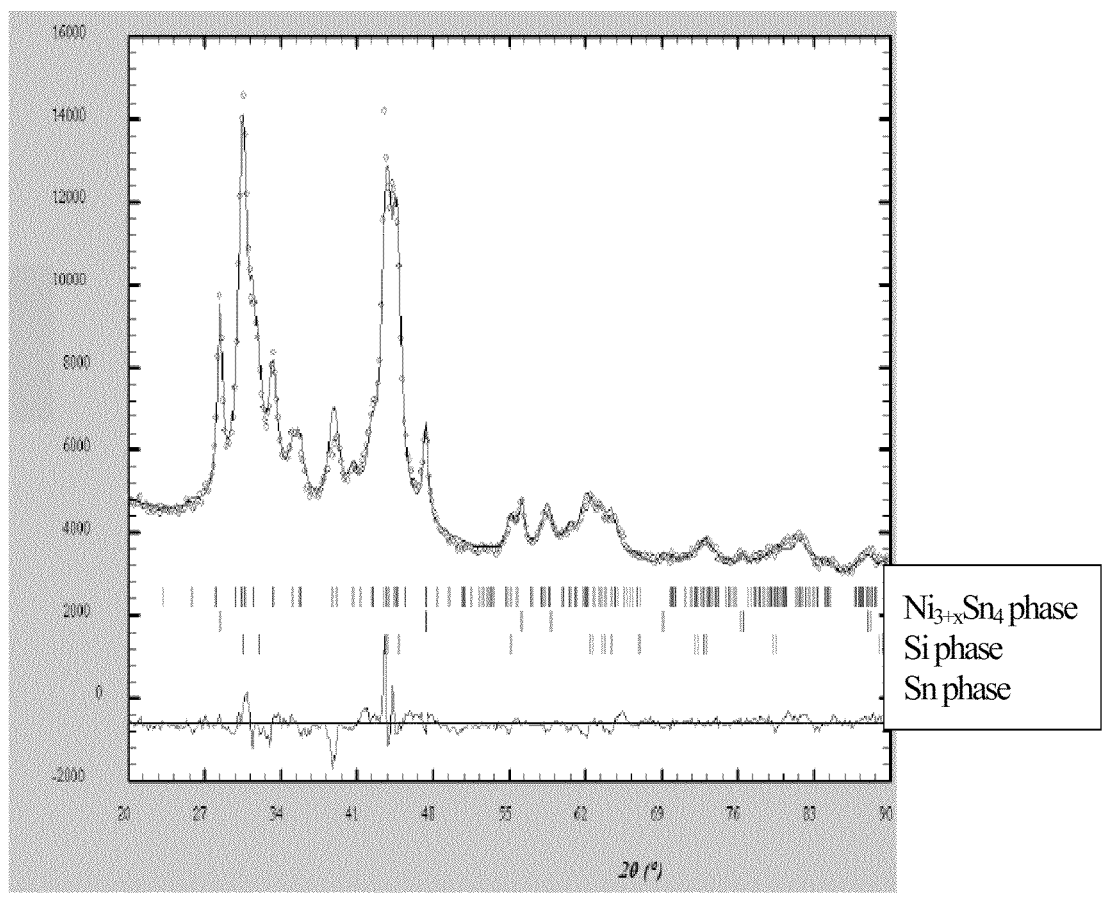
FIG. 3: Rietveld analysis of the compound $Si_{0.32}Sn_{0.18}C_{0.32}Ni_{0.14}Al_{0.04}$ after grinding for 20 h. The pattern is refined with three phases: $Ni_{3.4}Sn_4$, Si and Sn.

The XRD diffraction pattern of the prealloy $Ni_{3.4}Sn_4$ is represented in FIG. 1. The evolution of the XRD diffraction patterns of the $Ni_{3.4}Sn_4$, Sn° and silicon phases in the compound $Si_{0.32}Sn_{0.18}C_{0.32}Ni_{0.14}Al_{0.04}$ as a function of the grinding time is shown in FIG. 2. The XRD diffraction pattern of the $Ni_{3.4}Sn_4$, tin and silicon phases in the compound $Si_{0.32}Sn_{0.18}C_{0.32}Ni_{0.14}Al_{0.04}$ after grinding for 20 h is shown in FIG. 3. During the mechanical grinding, the disappearance of the diffraction rays of the aluminium and the broadening of the peaks corresponding to the Si and $Ni_{3.4}Sn_4$ phases are noted. The diffraction pattern of the sample after grinding for 20 hours can be indexed correctly with three phases: a crystalline phase with the structure of silicon (space group F d-3 m), a crystalline phase with the structure type $Ni_{3.4}Sn_4$ (space group C 2/m) and a minority crystalline phase of the Sn type (space group I $4_1$/a m d). The Rietveld analysis of the sample after grinding for 20 hours allows the contents by mass of the $Ni_{3.4}Sn_4$, Si and Sn° type phases to be measured at 72% by mass, 23% by mass and 5% by mass respectively. The crystallite sizes are close to 10 nm for all of the phases.

TABLE 1 comparison of the lattice parameters of the phases, refined by the Rietveld method, of the alloy $Si_{0.32}Sn_{0.18}C_{0.32}Ni_{0.14}Al_{0.04}$ with those of Si and Sn°.

| Phase | Space group | Lattice parameter (Å) (refinement) | Lattice parameter (Å) (pure elements) | Crystallite size (nm) | Content (mass.%) |
|---|---|---|---|---|---|
| $Ni_{3.4}Sn_4$ | C 2/m | a = 12.37 (1)<br>b = 4.057 (1)<br>c = 5.194 (1)<br>β = 104.6 (1)° | | 7 | 72 |
| Si | F d-3 m | a = 5.434 (3) | a = 5.431 | 13 | 23 |

TABLE 1-continued comparison of the lattice parameters of the phases, refined by the Rietveld method, of the alloy $Si_{0.32}Sn_{0.18}C_{0.32}Ni_{0.14}Al_{0.04}$ with those of Si and Sn°.

| Phase | Space group | Lattice parameter (Å) (refinement) | Lattice parameter (Å) (pure elements) | Crystallite size (nm) | Content (mass.%) |
|---|---|---|---|---|---|
| Sn | I $4_1$/a m d | a = 5.855 (1)<br>c = 3.184 (1) | a = 5.830<br>c = 3.186 | 10 | 5 |

The addition of carbon allows almost all of the starting phase $Ni_{3.4}Sn_4$ to be kept during the mechanical grinding. However, for long grinding times (GT=20 h), the Sn° type phase starts to appear (5 mass. %), which can indicate the start of decomposition of the $Ni_{3.4}Sn_4$ type phase.

The microstructure of the material after grinding for 20 hours was analysed by TEM. The acquisition of images in scanning transmission electron microscopy (STEM) mode and of the analytical maps by scanning electron microscopy coupled with the (EDX) chemical analysis show the formation of a bimodal microstructure. This microstructure is formed by pure Si surrounded by a second component that is finer and multi-elemental. The particles containing silicon have a size of approximately 100 nm.

Figure 4:
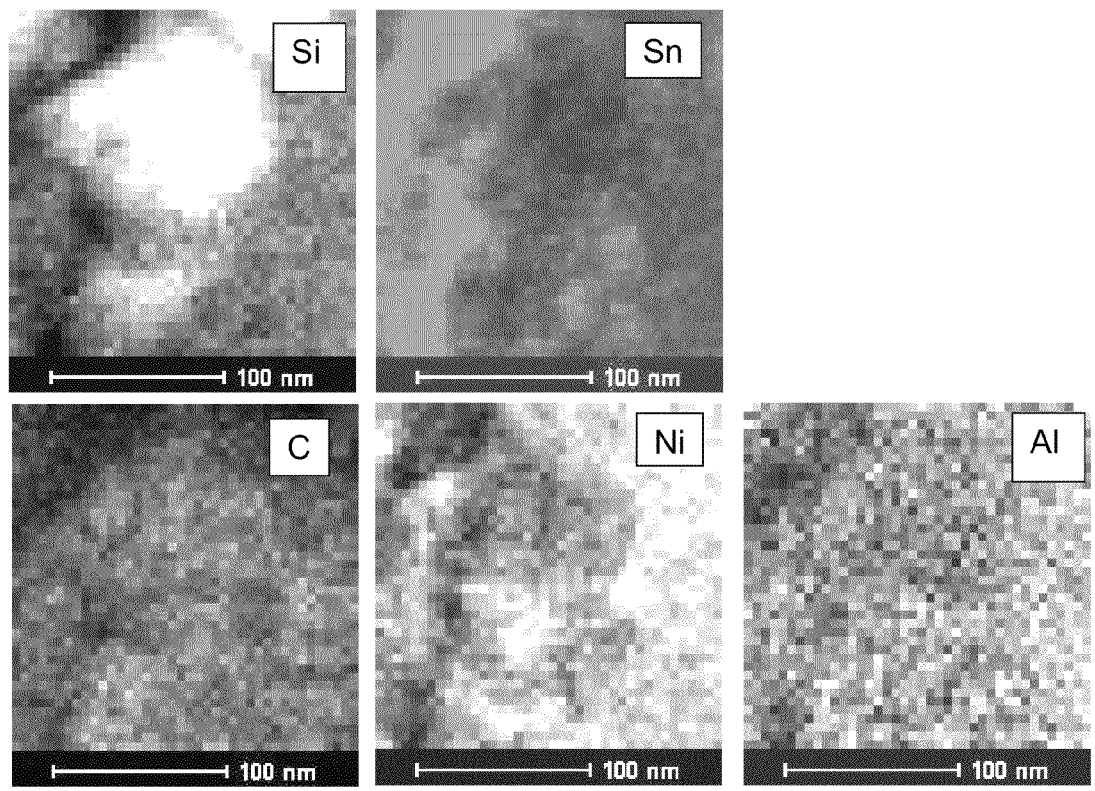
FIG. 4: Maps of the concentrations of the elements Si, Sn, Ni, Al and C in the alloy measured by EDX analysis using TEM.

The composition of the multi-elemental phase is not homogeneous. In fact, on the EDX maps (FIG. 4), it may be noted for example that the reinforcement of the Sn signal is not followed by that of Ni. An elementary analysis of the concentration profile on a linear zone between an Sn-rich phase and an Si-rich phase (FIGS. 5a and 5b) highlights Sn-enriched regions on a nanoscale. This result is consistent with the detection of a minority Sn type phase by XRD (FIG. 3). Moreover, carbon is widely dispersed in the material.

Figure 5A:
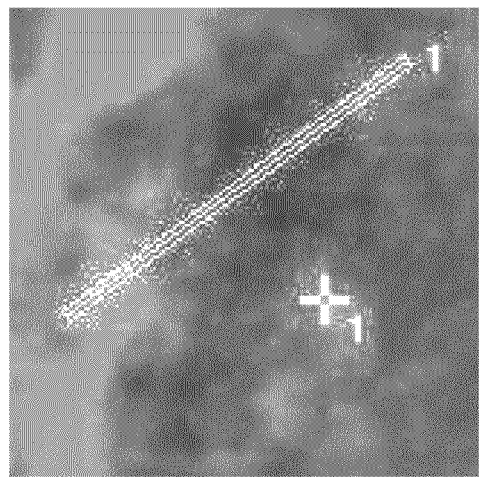
FIG. 5a: Map of the concentration of tin in the alloy measured by EDX analysis using TEM.
Figure 5B:
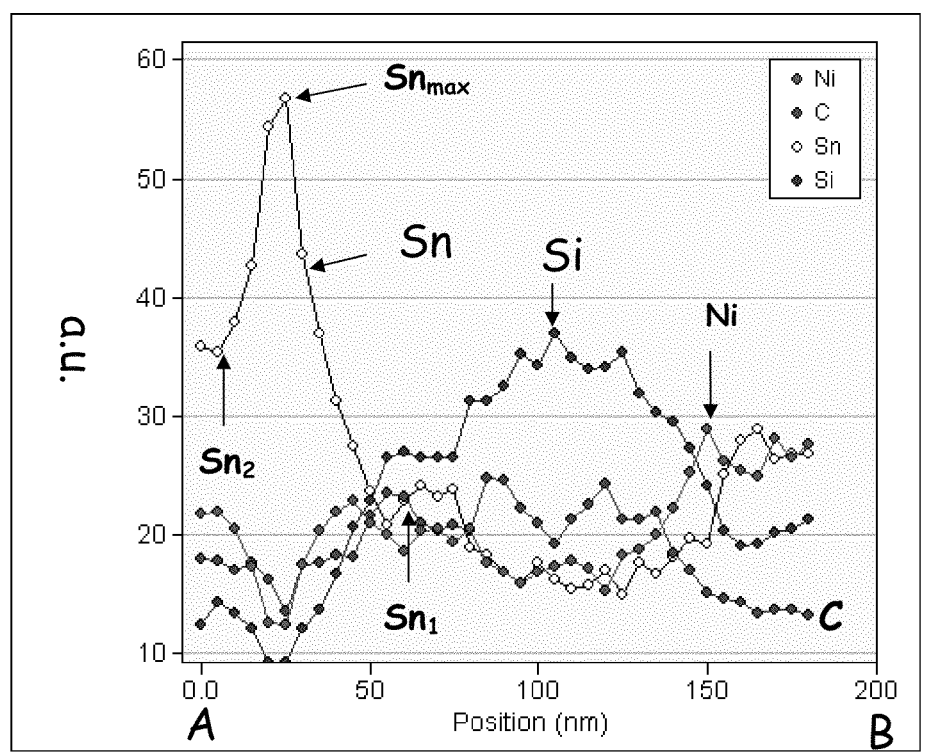
FIG. 5b: Profile of the concentration by mass of Si, Sn, Ni and C measured on the line defined in FIG. 5a. $Sn_{max}$ indicates the concentration at the top of the concentration peak and $Sn_1$ and $Sn_2$ indicate the Sn concentrations at the two bases of the peak. The section AB indicates the line on which the concentration profile is measured.

FIG. 5b represents a chemical map along the line of section in FIG. 5a. The region of the profile comprised between approximately 50 and 150 nm indicates a significant presence of silicon. This represents 20-35 arbitrary units (a.u.). Below 50 nm and over 150 nm, the presence of silicon is less significant because it represents less than 22 a.u. Conversely, the region of the profile comprised between approximately 50 and 150 nm indicates that the phase containing tin, i.e. containing either Sn° or M-Sn, is present in a low quantity. This represents 15 to 25 a.u. Below approximately 50 nm and over 150 nm, the phase containing tin is present in a larger quantity because it represents at least 20 a.u. The tin-enrichment is particularly marked at the 25 nm position of the profile, where a quantity of phase containing tin of 55 a.u. is measured. The profile of FIG. 5b therefore shows that there is a tin-enriched phase around the particles containing silicon.

FIG. 5b makes it possible to illustrate what is meant by tin-enriched phase. A phase is tin-enriched if, on at least one concentration profile measured with the transmission electron microscope, the alloy has a concentration peak which is such that the ratio $Sn_{max}/Max(Sn_1, Sn_2)$ is greater than 1.1, preferably greater than 1.3;

where $Sn_{max}$ indicates the concentration by mass at the maximum of the concentration peak of tin;

$Sn_1$ and $Sn_2$ indicate the concentrations by mass at tin at the two bases of the peak; and $Max(Sn_1, Sn_2)$ represents the maximum value for $Sn_1$ and $Sn_2$;

the concentration profile having, as an origin, a point distant from the centre of the particles containing silicon by a distance comprised between 20 and 100 nm;

the centre of the particles containing silicon being defined as the point corresponding to the centre of the zones of the highest concentration of silicon measured by transmission electron microscopy (TEM) imaging.

Preparation of the Electrodes:

The powder of active material $Si_{0.32}Sn_{0.18}C_{0.22}Ni_{0.24}Al_{0.04}$ is mixed with carbon black and carboxymethyl cellulose (CMC) in an aqueous medium. The suspension is homogenized then uniformly distributed on a copper foil. After drying, the electrode contains 30% carbon black and 30% CMC. The electrodes are tested in a button technology using lithium metal as counter electrode.

Figure 6:
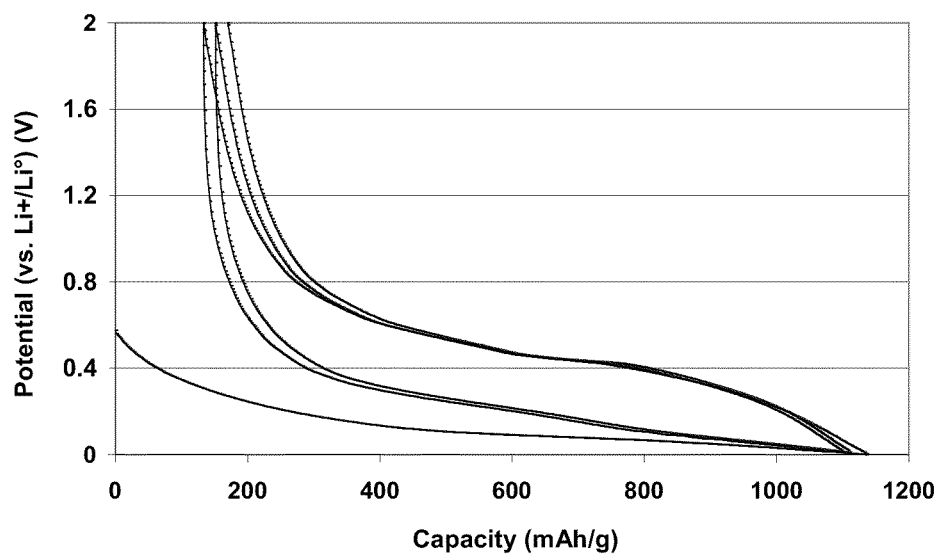
FIG. 6: Evolution of the potential of the electrode based on the alloy $Si_{0.32}Sn_{0.18}C_{0.32}Ni_{0.14}Al_{0.04}$ as a function of the charged capacity for the first charge/discharge cycles. Measurement of the reversible capacity of the compound $Si_{0.32}Sn_{0.18}C_{0.32}Ni_{0.14}Al_{0.04}$.

Electrochemical Results:

FIG. 6 represents the profile of the first charge and discharge cycles. The initial reversible capacity is 950 mAh/g.

Figure 7:
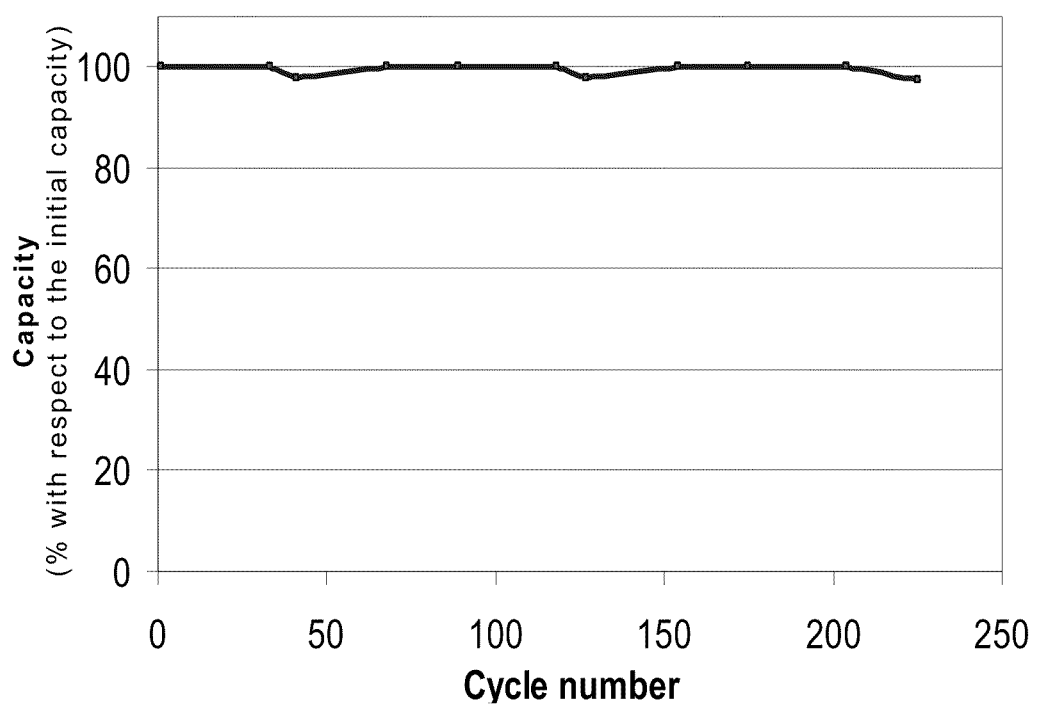
FIG. 7: Evolution of the reversible capacity of the alloy $Si_{0.32}Sn_{0.18}C_{0.32}Ni_{0.14}Al_{0.04}$ (Example 1) as a function of the number of charge/discharge cycles.

FIG. 7 represents the characterization of the stability of the electrochemical cycle capacity. It is noted that there is no significant loss of capacity after more than 200 cycles.

The electrochemical capacity of the material $Si_{0.32}Sn_{0.18}C_{0.32}Ni_{0.14}Al_{0.04}$ therefore yields excellent electrochemical results, i.e. an initial capacity of approximately 950 mAh/g, which is stable more than 200 cycles.

The alloy according to the invention has a high electrochemical capacity for a measurement carried out at a temperature of 0° C. It can advantageously be used at very low temperatures, for example comprised between −40° C. and +10° C.

The following examples of alloys were prepared using the process of the invention.

Example 2

$Si_{0.37}Sn_{0.14}Al_{0.02}Cu_{0.17}C_{0.30}$ (at. %) was synthesized using a $Cu_6Sn_5$ prealloy by metallurgy of the powders followed by production of the alloy by mechanosynthesis (approximately 20 h) from a silicon powder with a granulometry of less than 1 μm and carbon having a specific surface area of 30 m²/g.

Example 3

$Si_{0.33}Sn_{0.12}Al_{0.03}Fe_{0.12}C_{0.40}$ (at. %) was synthesized using a $Fe_{50}Sn_{50}$ prealloy by metallurgy of the powders followed by production of the alloy by mechanosynthesis (approximately 20 h) from a silicon powder with a granulometry of less than 1 μm; and carbon having a specific surface area of 30 m²/g.

Example 4 (Comparative)

$Si_{0.32}Sn_{0.18}C_{0.32}Ni_{0.14}Al_{0.04}$ was prepared under the following conditions. A mixture of Si, Sn, Ni and Al powders was milled for 20 hours without prior preparation of a Sn—Ni prealloy. The size of the silicium particles was higher than 1 μm. As in JP 2005-158305, ball milling was interrupted and carbon fibers were added to the obtained Si, Sn, Ni, Al composite. Ball milling was resumed and carried out for 2 hours. The resulting material consisted of beads with a size higher than 1 mm. An electrode could not be prepared with this material.

Example 5 (Comparative)

$Si_{0.32}Sn_{0.18}C_{0.32}Ni_{0.14}Al_{0.04}$ was prepared under the following conditions. A mixture of Si, Sn, Ni, Al and graphite powder was milled for 20 hours without prior preparation of a Sn—Ni prealloy. The size of the silicium particles was higher than 1 μm. The size of the graphite particles was 15 μm and their BET surface specific area was less than 10 m²/g. As in US2007/0148544, the alloy was obtained through a single mechanosynthesis step.

The cycle life of the cells the negative electrode of which comprises the alloys of Examples 1-5 was measured and indicated in Table 2 below:

TABLE 2

Comparison between the cycle life of the alloys according to the invention (Examples 1-3) and the cycle life of the alloys of the comparative examples (Examples 4-5).

|  | Cycle life (*) |
| --- | --- |
| Example 1 (invention) | >200 |
| Example 2 (invention) | 180 |
| Example 3 (invention) | 200 |
| Example 4 (Comparative example) | 0 (**) |
| Example 5 (Comparative example) | 70 |

(*): number of cycles for which the capacity of the cell is higher than 80% of initial capacity
(**) due to the huge particle size, an electrode with this material could not be prepared.

Figure 8:
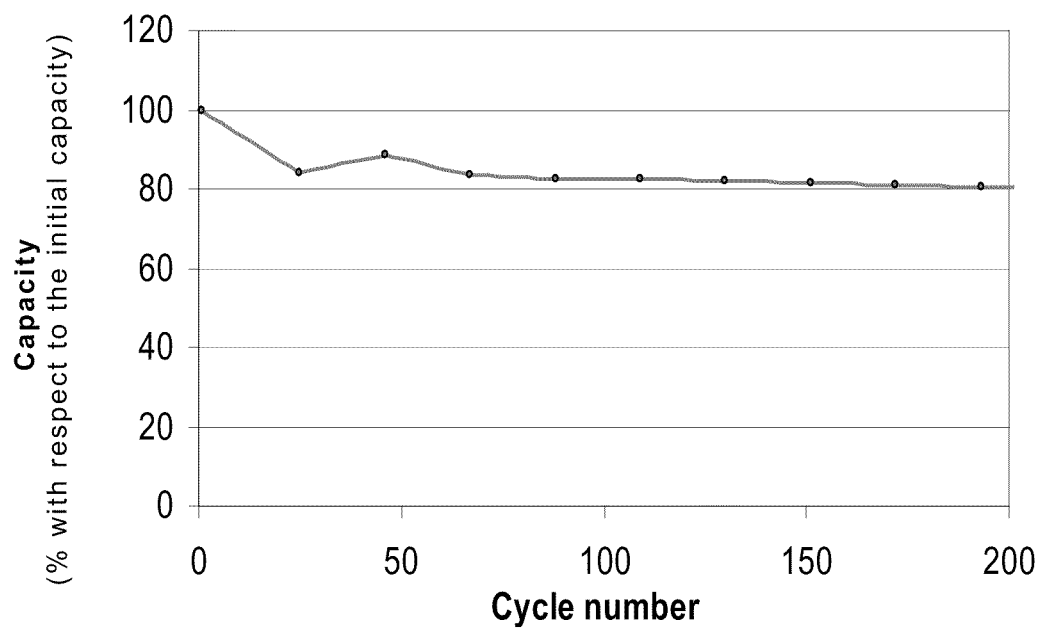
FIG. 8: Evolution of the reversible capacity of the alloy $Si_{0.37}Sn_{0.14}C_{0.30}Al_{0.02}Cu_{0.17}$ (Example 2) as a function of the number of charge/discharge cycles.
Figure 9:
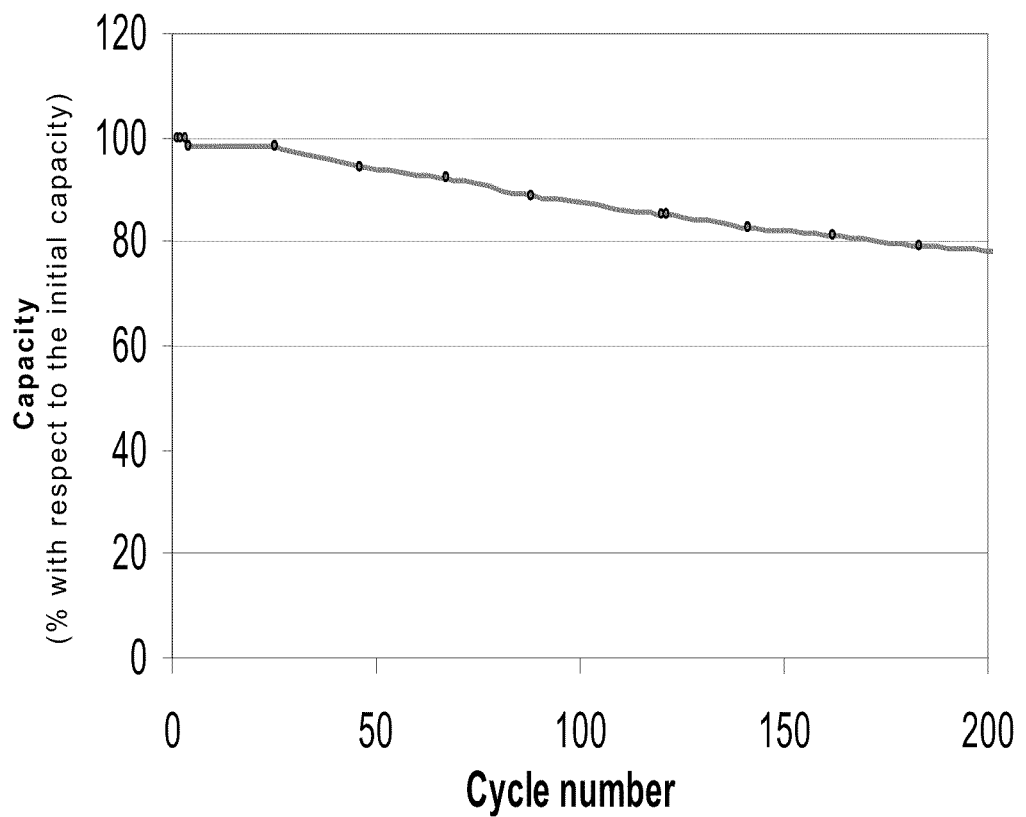
FIG. 9: Evolution of the reversible capacity of the alloy $Si_{0.33}Sn_{0.12}C_{0.40}Al_{0.03}Fe_{0.12}$ (Example 3) as a function of the number of charge/discharge cycles.

The cells comprising an alloy according to the invention (Examples 1-3) exhibit a life cycle of about 200 cycles as shown in FIGS. 7, 8 and 9.

Figure 10:
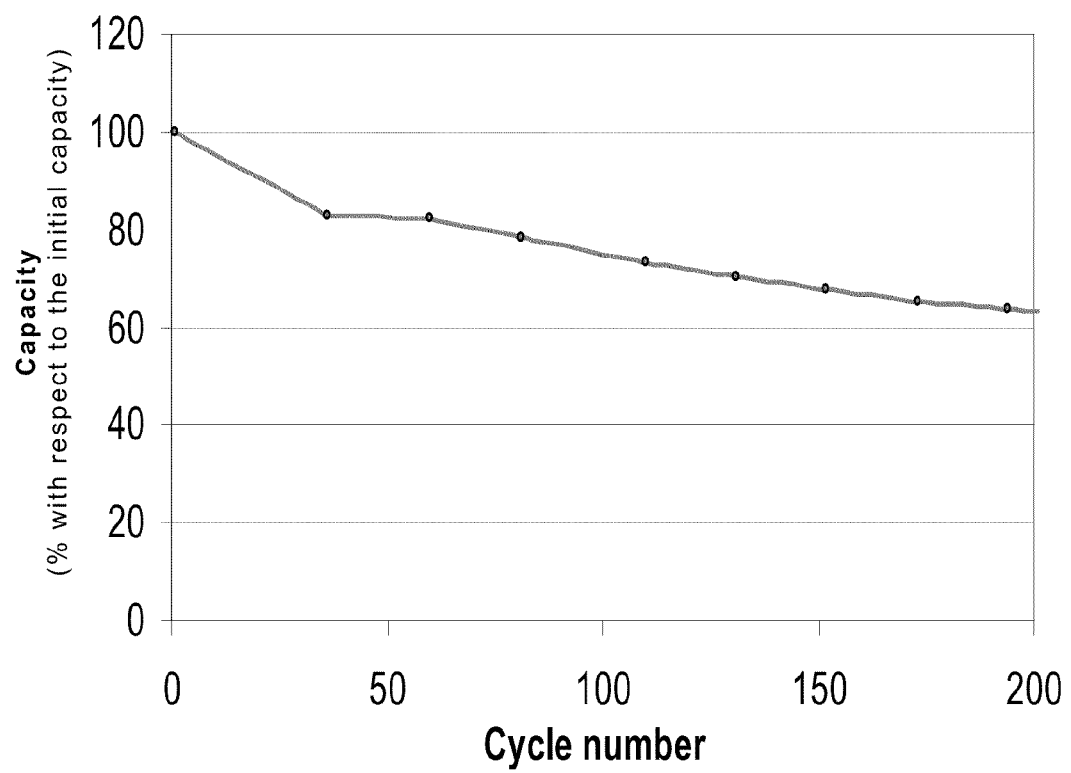
FIG. 10: Evolution of the reversible capacity of the alloy $Si_{0.32}Sn_{0.18}C_{0.32}Ni_{0.14}Al_{0.04}$ (Example 5 (Comparative)) as a function of the number of charge/discharge cycles.

The alloy of example 4 which is comparative could not be used for preparing an electrode prepared due to the too high particle size. The alloy of Example 5 exhibit a low life cycle of only 70 cycles as shown in FIG. 10. The comparative examples 4-5 demonstrate the importance of using a M-Sn prealloy.

The invention claimed is:

1. Alloy comprising tin and silicon, comprising:
    a) a nanocrystalline phase containing at least 50 at. % of the element silicon (Si°);
    b) a nanocrystalline phase containing a compound based on tin (Sn);
    c) a nanocrystalline phase constituted by the element tin (Sn°).

2. The alloy according to claim 1, in which the nanocrystalline phase a) and/or particles containing silicon are covered at least partially by the nanocrystalline phase b) and/or the nanocrystalline phase c).

3. The alloy according to claim 2, in which the nanocrystalline phase a) and/or at least one particle containing silicon are covered at least partially by a nanocrystalline phase rich in tin, a phase rich in tin being present if, on at least one concentration profile measured with a transmission electron microscope, the alloy has a concentration peak such that
    the ratio $Sn_{max}/Max(Sn_1, Sn_2)$ is greater than 1.1;
    where
    $Sn_{max}$ indicates the concentration by mass at the maximum of the concentration peak of tin;
    $Sn_1$ and $Sn_2$ indicate the concentrations by mass of tin at the two bases of the peak; and
    $Max(Sn_1, Sn_2)$ represents the maximum value for $Sn_1$ and $Sn_2$;

the concentration profile having, as an origin, a point distant from the centre of the particles containing silicon by a distance comprised between 20 and 100 nm;

the centre of the particles containing silicon being defined as the point corresponding to the centre of the zones of the highest concentration of silicon measured by transmission electron microscopy (TEM) imaging.

4. The alloy according to claim 3, in which the ratio $Sn_{max}$ $(Sn_1, Sn_2)$ is greater than 1.3.

5. The alloy according to claim 2, in which at. % of tin (Sn°) in the nanocrystalline phase c) is up to 50% of the total quantity of tin present in the alloy.

6. The alloy according to claim 5, in which the at. % of tin (Sn°) in the nanocrystalline phase c) is from 5 to 50%, of the total quantity of tin present in the alloy.

7. The alloy according to claim 6, in which the at. % of tin (Sn°) in the nanocrystalline phase c) is from 10 to 40%, of the total quantity of tin present in the alloy.

8. The alloy according to claim 1, in which at. % of tin (Sn°) in the nanocrystalline phase c) is less than 5%, of the total quantity of tin present in the alloy.

9. The alloy according to claim 8, in which the molar percentage of tin Sn° in the nanocrystalline phase c) is less than 3% of the total quantity of tin present in the alloy.

10. The alloy according to claim 1, with the formula $Si_a Sn_b C_c M_m$ where M represents at least one inert metal, Al or a mixture thereof;

$0.20 \leq a \leq 0.80$;
$0.05 \leq b \leq 0.40$;
$0.05 \leq c \leq 0.50$;
$0.01 \leq m \leq 0.30$;
$a+b>0.45$;
$a+b+c+m=1$.

11. The alloy according to claim 1, in which the percentage by mass of the quantity of phase containing at least 95% silicon in phase a) is greater than 30%, of the total percentage by mass of silicon contained in the alloy.

12. The alloy according to claim 11, in which the percentage by mass of the quantity of phase containing at least 95% silicon in phase a) is greater than 40%, of the total percentage by mass of silicon contained in the alloy.

13. The alloy according to claim 1 not comprising an SiC phase.

14. The alloy according to claim 1 not comprising crystalline carbon.

15. The alloy according to claim 1, comprising Al present in an atomic fraction of the less than 0.05, with respect to the alloy.

16. The alloy according to claim 15, comprising Al present in an atomic fraction from 0.02 to 0.03, with respect to the alloy.

17. The alloy according to claim 1, in which a size of particles containing silicon is from 20 to 200 nm.

18. The alloy according to claim 17 in which the size of the particles containing silicon is from 20 to 100 nm.

19. The alloy according to claim 18 in which the size of the particles containing silicon is from 20 to 50 nm.

20. Electrode comprising an alloy according to claim 1.

21. Lithium-ion accumulator comprising at least one negative electrode which is an electrode according to claim 20.

* * * * *